US011714755B2

(12) United States Patent
Schumacher et al.

(10) Patent No.: US 11,714,755 B2
(45) Date of Patent: Aug. 1, 2023

(54) SYSTEM AND METHOD FOR SCALABLE HARDWARE-COHERENT MEMORY NODES

(71) Applicant: Hewlett Packard Enterprise Development LP, Houston, TX (US)

(72) Inventors: Derek Schumacher, Auburn, CA (US); Randy Passint, Chippewa Falls, WI (US); Thomas McGee, Chippewa Falls, WI (US); Michael Malewicki, Chippewa Falls, WI (US); Michael S. Woodacre, Winchester (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 16/944,905

(22) Filed: Jul. 31, 2020

(65) Prior Publication Data
US 2022/0035742 A1 Feb. 3, 2022

(51) Int. Cl.
G06F 12/08 (2016.01)
G06F 13/40 (2006.01)
G06F 12/0815 (2016.01)

(52) U.S. Cl.
CPC ...... *G06F 12/0815* (2013.01); *G06F 13/4027* (2013.01); *G06F 2212/1032* (2013.01)

(58) Field of Classification Search
CPC ......... G06F 12/0815; G06F 2212/1032; G06F 13/4027; G16F 13/4027
USPC ........................................................ 711/141
See application file for complete search history.

(56) References Cited

U.S. PATENT DOCUMENTS

| | | | |
|---|---|---|---|
| 5,710,907 | A | 1/1998 | Hagersten et al. |
| 5,860,146 | A | 1/1999 | Vishin et al. |
| 6,275,900 | B1 | 8/2001 | Liberty |
| 6,631,448 | B2 | 10/2003 | Weber |
| 6,898,687 | B2 | 5/2005 | Wu et al. |
| 6,944,719 | B2 | 9/2005 | Rowlands et al. |
| 7,774,551 | B2 | 8/2010 | Gaither et al. |
| 7,895,400 | B2 | 2/2011 | O'Krafka et al. |
| 8,719,547 | B2 | 5/2014 | Chinya et al. |

(Continued)

FOREIGN PATENT DOCUMENTS

| | | |
|---|---|---|
| CN | 105718242 A | 6/2016 |
| DE | 102013201079 A1 | 8/2013 |

OTHER PUBLICATIONS

Michael, M. et al.; "Coherence Controller Architectures for SMP-based CC-NUMA Multiprocessors"; Jun. 1, 1997; 10 pages.

(Continued)

*Primary Examiner* — Christopher B Shin
(74) *Attorney, Agent, or Firm* — Park, Vaughan, Fleming & Dowler LLP

(57) ABSTRACT

One embodiment can provide a node controller in a multi-processor system. The node controller can include a processor interface to interface with a processor, a memory interface to interface with a fabric-attached memory, a node-controller interface to interface with a remote node controller, and a cache-coherence logic to operate in a first mode or a second mode. The cache-coherence logic manages cache coherence for a local memory of the processor coupled to the processor interface when operating in the first mode, and the cache-coherence logic manages cache coherence for the fabric-attached memory coupled to the memory interface when operating in the second mode.

17 Claims, 5 Drawing Sheets

(56) References Cited

U.S. PATENT DOCUMENTS

| | | | |
|---|---|---|---|
| 8,799,588 B2 | 8/2014 | Guthrie et al. | |
| 9,684,597 B1* | 6/2017 | Eiriksson | G06F 12/0815 |
| 10,268,630 B1* | 4/2019 | Dropps | G06F 15/17331 |
| 10,366,006 B2* | 7/2019 | Xu | G06F 12/0817 |
| 10,402,330 B2* | 9/2019 | Kumar | G06F 12/0824 |
| 10,423,530 B2* | 9/2019 | Tourrilhes | G06F 12/0835 |
| 10,489,310 B2* | 11/2019 | Keeton | G06F 12/0804 |
| 10,592,465 B2* | 3/2020 | Dropps | G06F 12/0813 |
| 10,929,174 B2* | 2/2021 | Daglis | G06F 12/128 |
| 11,157,405 B2* | 10/2021 | Rustad | G06F 12/0895 |
| 2002/0002659 A1 | 1/2002 | Michael et al. | |
| 2011/0004732 A1 | 1/2011 | Krakirian et al. | |
| 2013/0205098 A1* | 8/2013 | Guthrie | G06F 12/0897 |
| | | | 711/146 |
| 2015/0186057 A1* | 7/2015 | Das Sharma | G06F 9/467 |
| | | | 711/153 |
| 2016/0328326 A1 | 11/2016 | Di et al. | |
| 2017/0228316 A1 | 8/2017 | Steinmacher-Burow | |
| 2018/0020054 A1* | 1/2018 | Woodacre | H04L 67/2842 |
| 2018/0322058 A1 | 11/2018 | Tourrilhes et al. | |
| 2019/0171574 A1 | 6/2019 | Wen | |
| 2020/0034146 A1* | 1/2020 | Williams | G06F 9/3004 |
| 2020/0089612 A1* | 3/2020 | Rustad | G06F 12/0826 |
| 2020/0379664 A1 | 12/2020 | Mittal et al. | |
| 2021/0092069 A1* | 3/2021 | Musleh | H04L 47/2441 |
| 2021/0200545 A1 | 7/2021 | Marolia et al. | |
| 2021/0303481 A1* | 9/2021 | Ray | G06T 1/20 |
| 2022/0035742 A1 | 2/2022 | Schumacher et al. | |

OTHER PUBLICATIONS

Chaiken, D et al.; "Software-Extended Coherent Shared Memory: Performance and Cost"; Jan. 5, 1998; 11 pages.

Hong et al., "Hardware Implementation and Analysis of Gen-Z Protocol for Memory-Centric Architecture", IEEE Access, Digital Object Identifier, Jul. 22, 2020, 10 pages.

Intel Corporation, "Logical PHY Interface (LPIF) Specification", available online at <https://www.intel.com/content/dam/www/public/US/en/documents/technical-specifications/logical-phy-interface-specification.pdf>, Mar. 23, 2019, 63 pages.

Keim, J. et al.; "A Hybrid Memory Model for Accelerators"; Jun. 19-23, 2010; 12 pages.

Mark Funk, "Weaving Together the Machine's Fabric Memory", The Next Platform available online at <https://www.nextplatform.com/2016/01/18/weaving-together-the-machines-fabric-memory/>, Jan. 18, 2016, 9 pages.

Muthukumar, S et al.; "Hybrid Cache Coherence Protocol for Multi-Core Processor Architecture"; May 2013; 6 pages.

Shauradou "Gen-Z Primer for Early Adopters", <https://www.plda.com/blog/category/technical-article/gen-z-primer-early-adopters>. Nov. 2018. (Year: 2018).

Silicon Graphics, Inc., "System Overview," SGI Altix 3000 User's Guide, Ch. 3, Jan. 2003, 22 paages.

Song, Wonjun, and John Kim. "A Case for Software-Based Adaptive Routing in NUMA Systems." 2019 IEEE 37th International Conference on Computer Design (ICCD). IEEE, 2019. (Year: 2019).

Timothy Prickett Morgan, "CXL and Gen-Z Iron out a Coherent Interconnect Strategy", The Next Platform, available online at <https://www.nextplatform.com/2020/04/03/cxl-and-gen-z-iron-out-a-coherent-interconnect-strategy/>, Apr. 3, 2020, 9 pages.

Timothy Prickett Morgan, "Inside HPE's Gen-Z Switch Fabric", The Next Platform, available online at <https://www.nextplatform.com/2019/09/09/inside-hpes-gen-z-switch-fabric/>, Sep. 9, 2019, 15 pages.

Wikipedia, "Cache coherence," Jul. 29, 2020, <https://en.wikipedia.org/w/index.php?title=Cache_coherence&oldid=970166753>.

* cited by examiner

SYSTEM AND METHOD FOR SCALABLE HARDWARE-COHERENT MEMORY NODES

BACKGROUND

Field

This disclosure is generally related to scalable memory nodes in multiprocessor systems. More specifically, this disclosure is related to a system and method that implements dual-mode node controllers to facilitate a hybrid memory system that includes different types of memories.

Related Art

In a multiprocessor system, it is desirable to be able to scale memory in a hardware cache-coherent fashion. Hardware-managed cache coherency schemes are advantageous over software-managed cache coherency schemes, which require significant software application modifications. Scaling memory in a hardware-coherent fashion enables the unmodified software to take advantage of the additional memory seamlessly. However, current processor-memory-centric computing architectures require simultaneous scaling of the processors when memories are scaled. In situations where only additional memories are needed, having to add processors can lead to undesired cost increases.

BRIEF DESCRIPTION OF THE FIGURES

In the figures, like reference numerals refer to the same figure elements.

DETAILED DESCRIPTION

Figure 1:
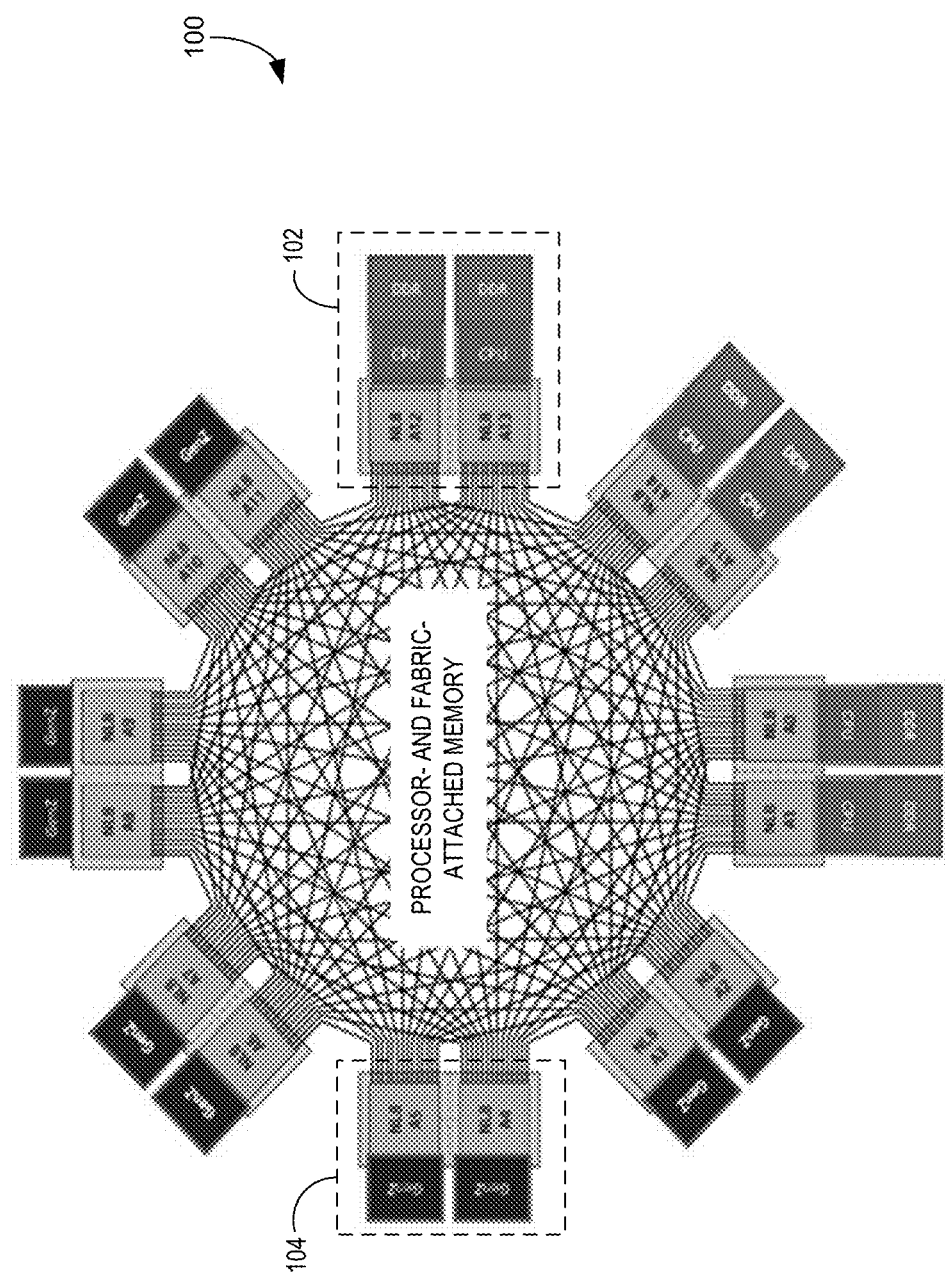
FIG. 1 illustrates an exemplary hybrid non-uniform memory access (NUMA) system, according to one embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the scope of the present disclosure is not limited to the embodiments shown, but is to be accorded the widest scope consistent with the principles and features disclosed herein.

The embodiments described herein facilitate the implementation of a hybrid memory system (e.g., a cache-coherent non-uniform memory access (ccNUMA) system). The hybrid memory system can include, within the same hardware-controlled cache-coherence domain both processor-attached memories and fabric-attached memories. The inclusion of the fabric-attached memories allows for independent scaling of processors and memories. The hybrid system can also include a unified node controller capable of controlling cache coherence of both types of memories. More specifically, the node controller can operate in two modes. When the node controller has a directly attached processor socket, the node controller operates in the first mode and manages hardware coherence of processor-attached memories. When there is no processor attached to the node controller, the node controller operates in the second mode and manages hardware coherence of fabric-attached memories. The node controller can include a processor interface for interfacing with a processor and a memory interface for interfacing with a fabric-attached memory (e.g., a Gen-Z memory module). The node controller can also include a number of logic blocks implementing hardware controlled cache coherence, including a local-home (LH) logic block that controls local memory accesses, and a remote-home (RH) logic block that controls remote memory accesses. When operating in the first mode, the LH logic block can forward a received memory-access request to the processor, which can then facilitate the memory access and send the memory-access response back to the LH logic block. On the other hand, when operating in the second mode, there is no processor attached to the node controller, so the LH logic block can forward the memory-access request to the RH logic block via a special path (e.g., a shortcut or a loopback path). The RH logic block does not need to distinguish between whether it receives the memory-access request from the processor or the loopback path, and can process the memory-access request based on the memory address.

In recent years, memory-centric computing technologies are gradually replacing traditional processor-centric computing technologies to meet the ever-increasing demand for computing speed and storage capacity. Moreover, implementation of fabric-attached memories (i.e., memories that are accessible over a switch fabric) has made it possible to expand memory in a cache-coherent system without needing to add processors. In some embodiments, a ccNUMA system can include hybrid memories, with some memories being processor-attached memories and some being fabric-attached memories.

FIG. 1 illustrates an exemplary hybrid non-uniform memory access (NUMA) system, according to one embodiment. In FIG. 1, NUMA system 100 can include a plurality of nodes (or hubs), such as nodes 102 and 104. Each node can include one or more node controllers configured to facilitate communication among nodes and manage cache coherency. In the example shown in FIG. 1, some node controllers have processors attached to them and are configured to manage cache coherency for memories attached to the processors. Other node controllers do not have processors directly attached to them and can be configured to manage cache coherency for fabric-attached memories across a switch fabric. For example, node 102 can include a pair of node controllers, with a processor attached to each node controller and a memory module (e.g., a double-data rate (DDR) memory module) attached to each processor. A processor-attached memory can refer to a memory module that is local to a particular processor, and access to the memory occurs through that processor. On the other hand, node 104 only includes a pair of node controllers, with a fabric-attached memory module coupled to each node controller (e.g., via a Gen-Z fabric). Note that, for simplicity of illustration, each of the node controllers in FIG. 1 is shown to be coupled to a single CPU or memory module. In practice, a node controller can be coupled to multiple processors and/or multiple memory modules. For example, node controller 102 can be coupled to a set of processors, with each processor being associated with one or more memory modules. Similarly, node controller 104 can be coupled to a plurality of memory modules via a switching fabric.

FIG. 1 also demonstrates that all node controllers are interconnected to allow logical sharing of physically separated memories, regardless of whether a memory is attached to a processor or to a switching fabric. In other words, memory-access requests can be sent from one node controller to another to access memories attached to a different node controller. For example, the node controller within node 102 can send a memory request, which can originate from a processor within node 102, to the node controller within node 104 in order to access the fabric-attached memory within node 104. The cache coherency of NUMA system 100 can be managed by the hardware within each node controller. Upper layer software does not need to manage cache coherency among the distributed memory modules within NUMA system 100.

Figure 2:
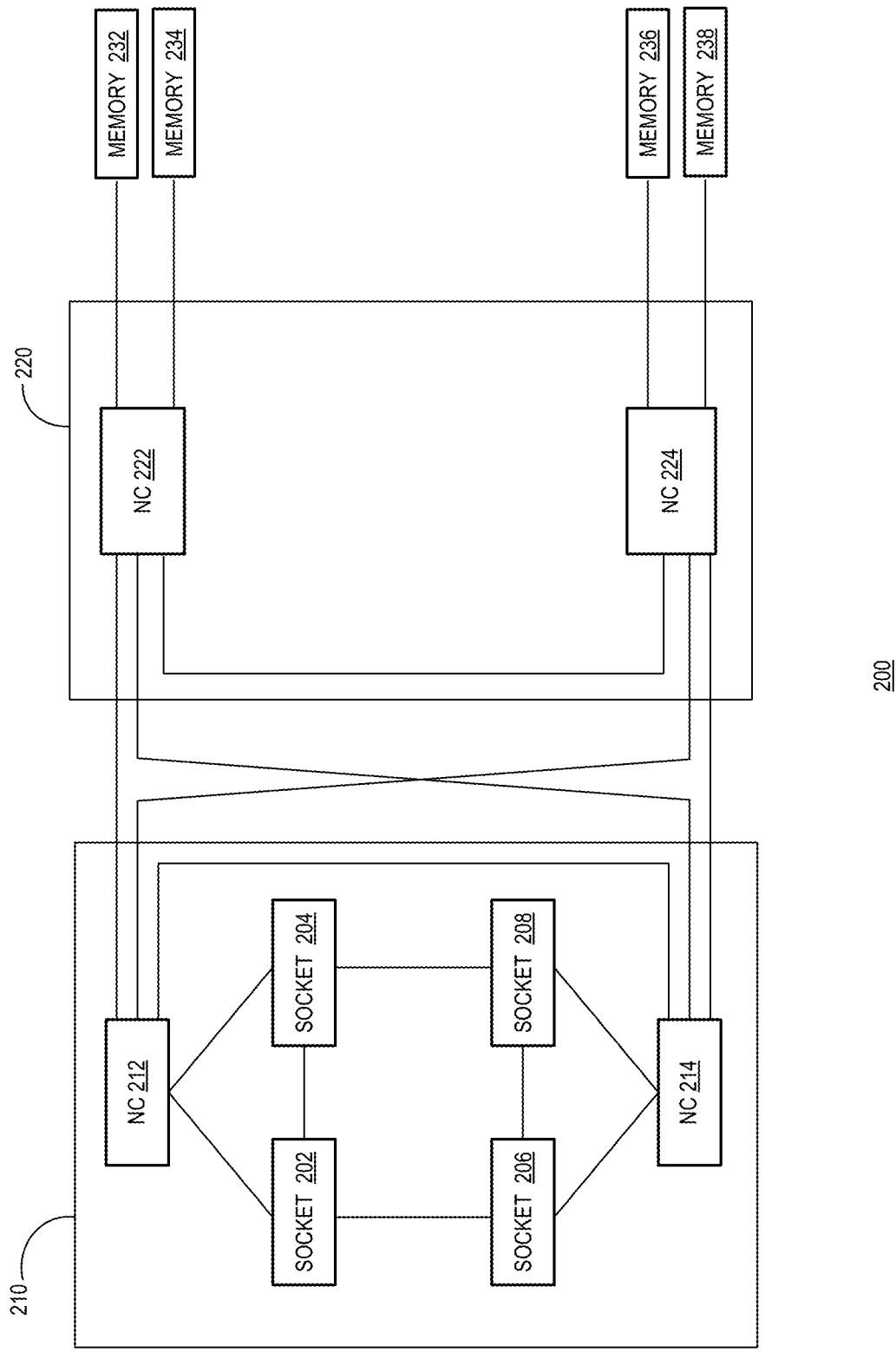
FIG. 2 illustrates a partial view of a cache-coherent NUMA (ccNUMA) system, according to one embodiment.

FIG. 2 illustrates a partial view of a ccNUMA system, according to one embodiment. More specifically, FIG. 2 shows a close-up view of a pair of nodes (i.e., node 210 and node 220) that are similar to nodes 102 and 104 shown in FIG. 1, respectively. In a multiprocessor system, a node includes a variety of resources (e.g., processors, memories, controllers, etc.) that are residing at a close physical proximity (e.g., within a computer chassis). A node controller (which can also be referred to as a hub) can be an electronic device, such as an integrated circuit, that controls communication and messaging within a node and between different nodes. In addition, a node controller can include a logic that implements a cache-coherence protocol (e.g., a directory-based cache-coherence protocol) to ensure cache coherency within ccNUMA system 200. In the example shown in FIG. 2, node 210 can include node controllers 212 and 214, and node 220 can include node controllers 222 and 224. All node controllers are interconnected to each other, via node-controller interfaces, to allow memory access from one node controller to any other node controller.

Node 210 can also include a plurality of interconnected processor sockets (e.g., sockets 202-208), forming a socket group. A processor socket can include one or more processors, and each processor can have at least one local memory. In this disclosure, the terms "processor socket" and "socket" can be interchangeable. Sockets within a node (e.g., sockets 202-208) can be considered local to each other. A node controller can be directly coupled to one or more processor sockets (e.g., via one or more processor interfaces). In the example shown in FIG. 2, each node controller can be directly coupled to two processor sockets. For example, node controller (NC) 212 is directly coupled to sockets 202 and 204, and node controller 214 is directly coupled to sockets 206 and 208. In one embodiment, the processor interface can include an UltraPath Interconnect (UPI).

On the other hand, node 220 does not include any processor sockets (meaning that there is no processor or socket directly attached to its node controllers). In contrast, each node controller can be coupled to one or more fabric-attached memories. For example, node controller 222 is coupled to memories 232 and 234, and node controller 224 is coupled to memories 236 and 238. In some embodiments, a node controller can include a memory interface that facilitates the coupling between the node controller and the fabric-attached memory. Various types of memory interface can be used, including but not limited to: a DDR interface, a graphic DDR (GDDR) interface, a high bandwidth memory (HBM) interface, a Peripheral Component Interconnect Express (PCIe) interface, a compute express link (CXL) interface, a Gen-Z interface, an Infiniband® interface, an Ethernet interface, a Fibre Channel interface, etc.

As one can see from FIG. 1 and FIG. 2, a hybrid NUMA system can include different types of node, with some nodes including sockets and some not. To reduce cost, it is desirable to use a modular approach. More specifically, controllers within each node can be standard components, regardless of the type of node they are in. In other words, the same node controller should be able to manage cache coherency for processor-attached memories if it is deployed in a node comprising sockets, as well as manage cache coherency for fabric-attached memories if it is deployed in a node comprising no sockets. In some embodiments, the node controller can include both processor interfaces and memory interfaces. The processor interfaces allow the node controller to be coupled with processors and processor-attached memories, and the memory interfaces allow the node controller to be coupled with fabric-attached memories. Depending on the type of memories needing management, a node controller can be configured to operate in two different nodes. More specifically, when coupled to a processor, the node controller can forward remote memory-access requests to the processor to facilitate the processor in performing corresponding memory-access operations. On the other hand, when coupled to a fabric-attached memory, the node controller can loop the memory-access request among the hardware logic blocks managing cache coherency, allowing the hardware logic blocks to perform the corresponding memory-access operations.

Figure 3:
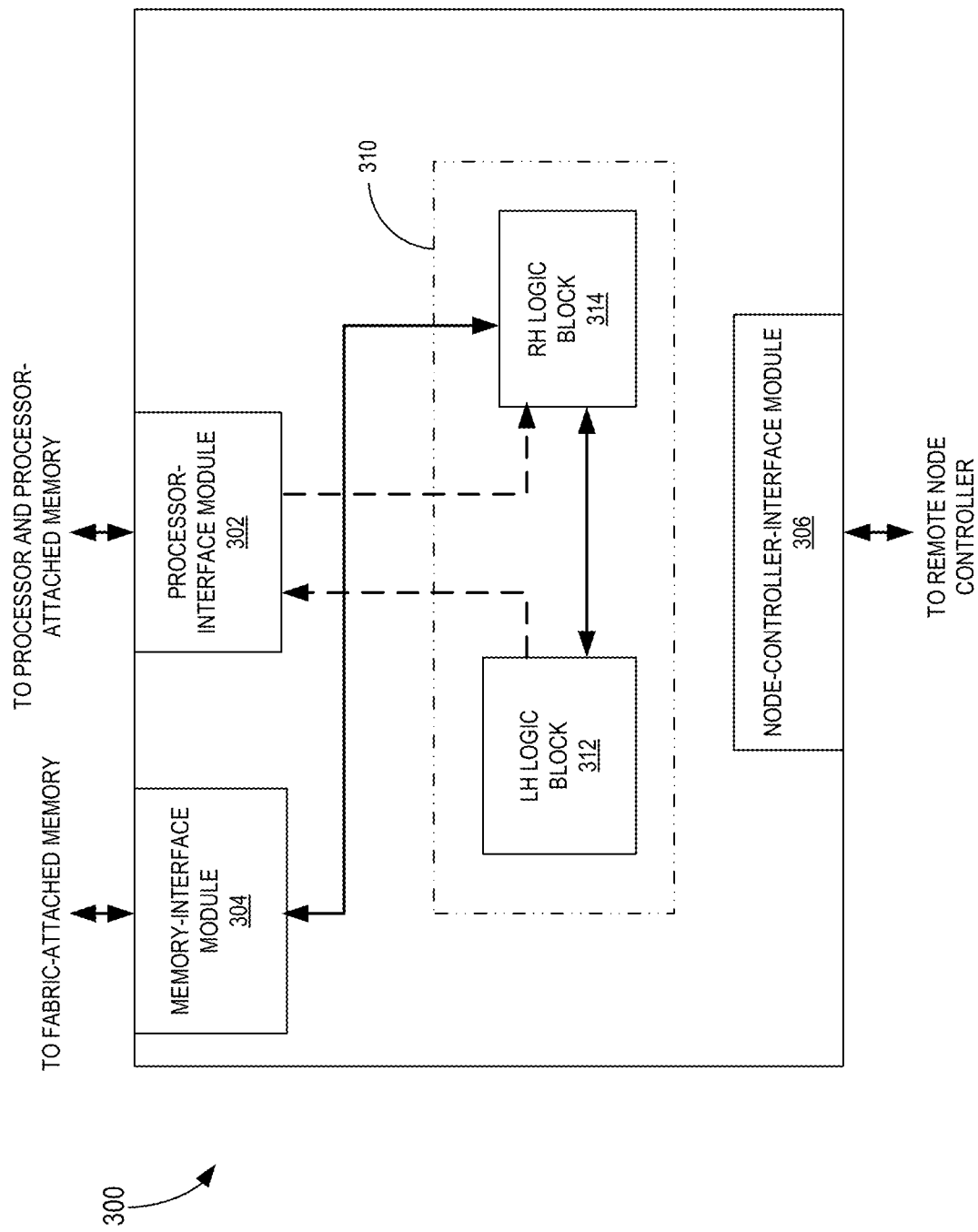
FIG. 3 illustrates an exemplary block diagram of a node controller, according to one embodiment.

FIG. 3 illustrates an exemplary block diagram of a node controller, according to one embodiment. Node controller 300 can include a number of interface modules that facilitates the communication between node controller 300 and other modules outside of node controller 300, such as processors, memories, node controllers, etc. More specifically, node controller 300 can include a processor-interface module 302 that facilitates the communication between node controller 300 and a number of processors and memories attached to those processors. Node controller 300 can also include a memory-interface module 304 that facilitate the communication between node controller 300 and fabric-attached memories. Memory-interface module 304 can include various types of memory interface, such as a DDR interface, a GDDR interface, an HBM interface, a PCIe interface, a CXL interface, a Gen-Z interface, an Infiniband® interface, an Ethernet interface, a Fibre Channel interface, etc.

Depending on deployment of node controller 300, in certain scenarios, memory-interface module 304 can be left unused, and node controller 300 can be configured to manage memories attached to the processors via processor-interface module 302. In different deployment scenarios, processor-interface module 302 can be left unused, meaning that node controller 300 does not have a directly attached processor. Node controller 300 can then be configured to manage memories that are coupled to node controller 300 via memory-interface module 304.

Node controller 300 can also include a node-controller-interface module 306 that facilitates the communication between node controller 300 and other remote node controllers. The communication link between node controllers can implement various types of communication protocol, including Ethernet, Infiniband, Fibre Channel, etc. In one embodiment, node-controller-interface module 306 can include a custom-designed communication interface. To facilitate the cross connects among all node controllers within the NUMA system, node-controller-interface module 306 can be coupled to a switching mechanism, e.g., a crossbar.

Node controller 300 can also include a cache-coherence-logic block 310 that is configured to manage cache coherency for memories coupled to node controller 300. More specifically, cache-coherence-logic block 310 can implement a cache-coherence protocol (e.g., a directory-based cache-coherence protocol). The cache-coherence protocol can include a set of procedures or rules (which can be implemented as state machines or a microcontroller) that dictate how node controller 300 is to interact with an associated processor socket or memory depending upon the current coherence status for a particular memory block specified by a memory-access request. Coherence protocol may also dictate how to track the ownership of a cache line.

In some embodiments, cache-coherence-logic block 310 can include a local-home (LH) logic block 312 and a remote-home (RH) logic block 314. Both LH logic block 312 and RH logic block 314 can be implemented in various types of hardware module, including but not limited to, application-specific integrated circuit (ASIC) chips, field-programmable gate arrays (FPGAs), a complex programmable logic device (CPLD), or other programmable-logic devices.

LH block 312 can be configured to handle local memory-access requests. A typical local memory-access request can be forwarded by LH logic block 312 to a processor, if it is attached to node controller 300, and the processor can perform the corresponding memory-access request. On the other hand, RH block 314 can be configured to handle remote memory-access requests. More particularly, from the point of view of node controller 300, RH block 314 can be a proxy for a remote memory location. A memory-access request to a remote memory location will be sent (typically from a processor) to RH block 314.

In a traditional node controller that only manages cache coherence for processor-attached memories, the LH and RH blocks separately handle local and remote memory-access requests and do not interface with each other. More particularly, memory requests from the local processor can be sent to the RH block, and memory requests from a remote node controller can be sent to the LH block. The LH block can be configured to send the local request to the processor to facilitate the processor in directly accessing its local memory. The LH block is configured to determine ownership and maintain cache coherence for the local memory. For a remote request, the RH block can act as a proxy of a remote memory. More specifically, the RH block can receive the remote memory-access request from the processor (as indicated by the dashed arrow) and will, in turn, forward the memory-access request to a corresponding remote node controller, more particularly to the LH block of the remote node controller.

If the remote node controller has an attached processor and memory that is local to the processor, the LH block of the remote node controller can access the memory via the processor. However, if the remote node controller does not have a directly attached processor and is managing fabric-attached memories, access to the memories can no longer be facilitated by the processor. In such a scenario, modifications are needed to the configurations and operations of the node controller. More specifically, a special path can be established between the LH block and the RH block on the same node controller. Such a special path can be a direct path between the LH and RH blocks or a loopback path through the processor interface (i.e., the signal is routed to the processor interface and then looped back directly), to which the LH and RH blocks are coupled. This way, when the LH block of the remote node controller receives the memory-access request, instead of sending it to an attached processor, it can forward the request to the RH block. The RH block receives the memory-access request the same way it receives a request from a local processor, even though there is no processor attached to the node controller. Based on the address range, the RH block can forward the memory-access request to the memory interface in order to access the fabric-attached memory coupled to the same node controller.

By allowing the same node controller to operate in two different modes, the disclosed embodiments allow hardware-based coherence tracking for two different types of memories. In other words, the same coherence engine designed to track the cache coherency of the processor-attached memories can now be used to track cache coherency of the fabric-attached memories. There is no need to have a dedicated coherence engine for the fabric-attached memories. Note that, when a node controller does not have a directly attached processor, the operating system can be run by a different node controller that has a directly attached processor.

In addition to the modules shown in FIG. 3, node controller 300 can include additional modules, including hardware and software modules, which can assist the various aforementioned operations as well as other not-yet-mentioned operations. Moreover, node controller 300 can include duplicated modules (e.g., duplicated interfaces and duplicated logic blocks) to allow node controller 300 to interact with multiple of the same type of modules. For example, multiple UPI interfaces can allow node controller 300 to interface with multiple processors. Similarly, multiple memory interfaces can allow node controller 300 to interface with multiple fabric-attached memory modules. Moreover, multiple LH and RH logic blocks can facilitate parallel processing and forwarding of a plurality of memory-access requests.

Figure 4:
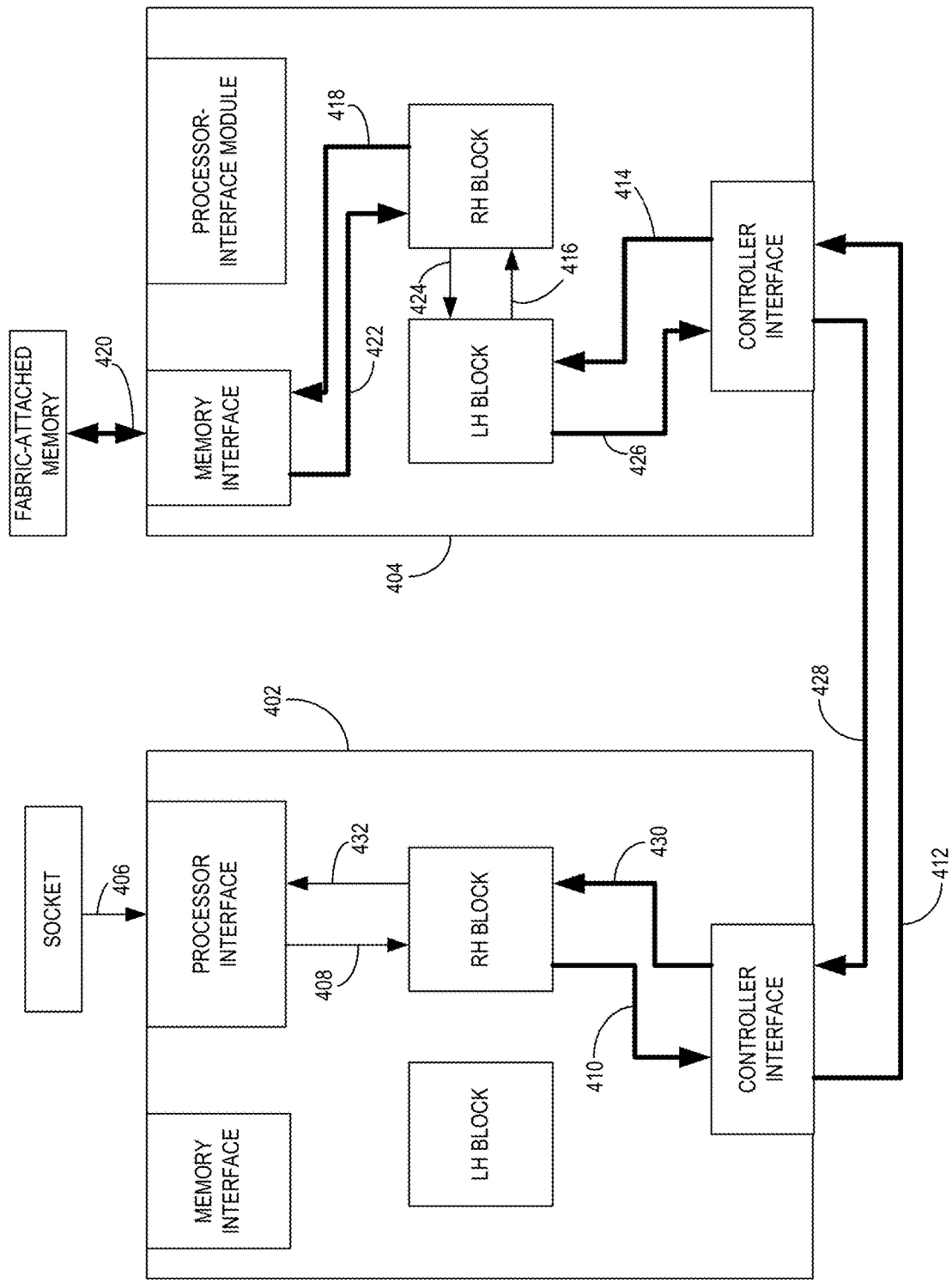
FIG. 4 illustrates exemplary interactions between a local node controller and a remote node controller during a remote-memory-access operation, according to one embodiment.

FIG. 4 illustrates exemplary interactions between a local node controller and a remote node controller during a remote-memory-access operation, according to one embodiment. During operation, the socket attached to a local node controller 402 sends a request to access the fabric-attached memory controlled by a remote node controller 404 via the processor interface of node controller 404, as indicated by an arrow 406. This remote memory-access request (e.g., a read request, a write request, a read-for-ownership request, etc.) arrives at the RH block of local node controller 402, as indicated by an arrow 408. The remote memory-access request can be in a processor-interconnect format, such as the UPI format.

The RH block of local node controller 402 performs various operations, including operations needed to maintain cache coherency. These operations include allocating a tracking resource, decoding the global address included in the request, and reformatting the request message from the processor-interconnect format to a node-controller-interconnect format, which can be determined according to the type of communication link between local node controller 402 and remote node controller 404.

The RH block of local node controller 402 can then forward the memory-access request to remote node controller 404 via the controller interface on each node controller, as indicated by arrows 410 and 412. Upon receiving the request, the controller interface of remote node controller 404 sends the request to its own LH block, as indicated by arrow 414. The LH block of remote node controller 404 can perform a number of operations, including operations necessary to ensure cache coherency. The various operations can include allocating a tracking resource, translating the format of the message from the node-controller-interconnect format back to the processor-interconnect format, checking the directory state of the corresponding memory block in order to determine ownership, etc.

Note that, if remote node controller 404 has an attached processor, the LH block will forward the received memory-access request to the processor, which can then directly access its local memory. However, in the example shown in FIG. 4, remote node controller 404 does not have a directly attached processor or socket. Instead, remote node controller 404 is coupled to one or more fabric-attached memory modules. In such a scenario, the LH block of remote node controller 404 can be configured to send the memory-access request to the RH block co-residing on remote memory controller 404, as indicated by an arrow 416. In other words, the fabric-attached memory is treated as if it is a remote memory, and accesses to such a memory are handled by the RH block. The special path can be a direct signal path (e.g., one or more signal connections within the integrated circuits) between the LH block and the RH block. Alternatively, the special path can be a loopback path through the processor interface (e.g., a UPI loopback path) on node controller 404.

From the point of view of the RH block on remote node controller 404, there is no difference between the memory-access request received from the LH block via the special path and a memory-access request received from a locally attached processor. In the example shown in FIG. 4, the RH block on remote node controller 404 can process the memory-access request as if it receives such a request from a processor and performs various operations similar to those performed by the RH block on local node controller 402, including allocating a tracking resource, decoding the global address included in the request, and reformatting the request message from the processor-interconnect format to the node-controller-interconnect format.

The RH block of remote node controller 404 can determine based on the address range of the memory-access request that the to-be-accessed memory block resides on the fabric-attached memory coupled to remote node controller 404 via its memory interface. The RH block can then forward the memory-access request to the memory interface, as indicated by an arrow 418. The memory interface can include a control logic that can process the memory-access request across the switching fabric (e.g., a Gen-Z fabric), as indicated by a double arrow 420. If the memory-access request is a read request, data will be returned from the fabric-attached memory. If it is a write request, to-be-written data will be sent to the fabric-attached memory. The memory interface can then assemble a response message and send the response message back to the RH block of remote node controller 404, as indicated by an arrow 422. For a read request, the response message can include the requested data; and for a write request, the response message can include a write confirmation message. The response message can be in the node-controller-interconnect format.

Upon receiving the response message, the RH block of remote node controller 404 can perform a number of operations, including confirming the correctness of the response and reformatting the response from the node-controller-interconnect format to the processor-interconnect format. The RH block can then return the response to the LH block on the same node controller via the same special path, as indicated by an arrow 424. As discussed previously, the special path can be a direct path or a loopback path through the processor interface. Note that, from the perspective of the LH block, there is no difference between receiving the response message from a locally attached processor and receiving the response message from the RH block via the special path. Subsequent to sending the response, the RH block can free the tracking resource.

Upon receiving the response message via the special path, the LH block of remote node controller 404 confirms the correctness of the response and updates the directory state of the memory block to track the new owner. This operation can be essential in ensuring cache coherency. The LH block of remote node controller 404 can further reformat the response message from the processor-interconnect format to the node-controller-interconnect format, and send the response message back, via the controller interfaces, to local node controller 402, which originates the request, as indicated by arrows 426 and 428. The LH block of remote node controller 404 subsequently frees its tracking resource.

The controller interface of local node controller 402 sends the response message to its RH block, as indicated by an arrow 430. This RH block confirms the correctness of the response and reformats the response from the node-controller-interconnect format to the processor-interconnect format. The RH block of local node controller 402 can send the response back to the processor, as indicated by an arrow 432, and subsequently frees its tracking resource.

According to the above discussion, the memory-access request and response message may travel from one hardware module to the next hardware module in two different formats: the processor-interconnect format and the node-controller-interconnect format. This is because the different modules are connected using different types of communication links. In FIG. 4, these two types of links are represented using arrows of different widths. Arrows with thicker lines represent node-controller-interconnect links and arrows with thinner lines represent processor-interconnect links. From FIG. 4, one can see that the links between LH and RH blocks and the links between an RH block and the processor interface are processor-interconnect links, whereas all other links are node-controller-interconnect links. A processor-interconnect link can be a UPI link. A node-controller-interconnect link can be one of: a custom-designed link, an Ethernet link, an Infiniband link, a CXL link, a Gen-Z link, a Fibre Channel link, etc.

Figure 5:
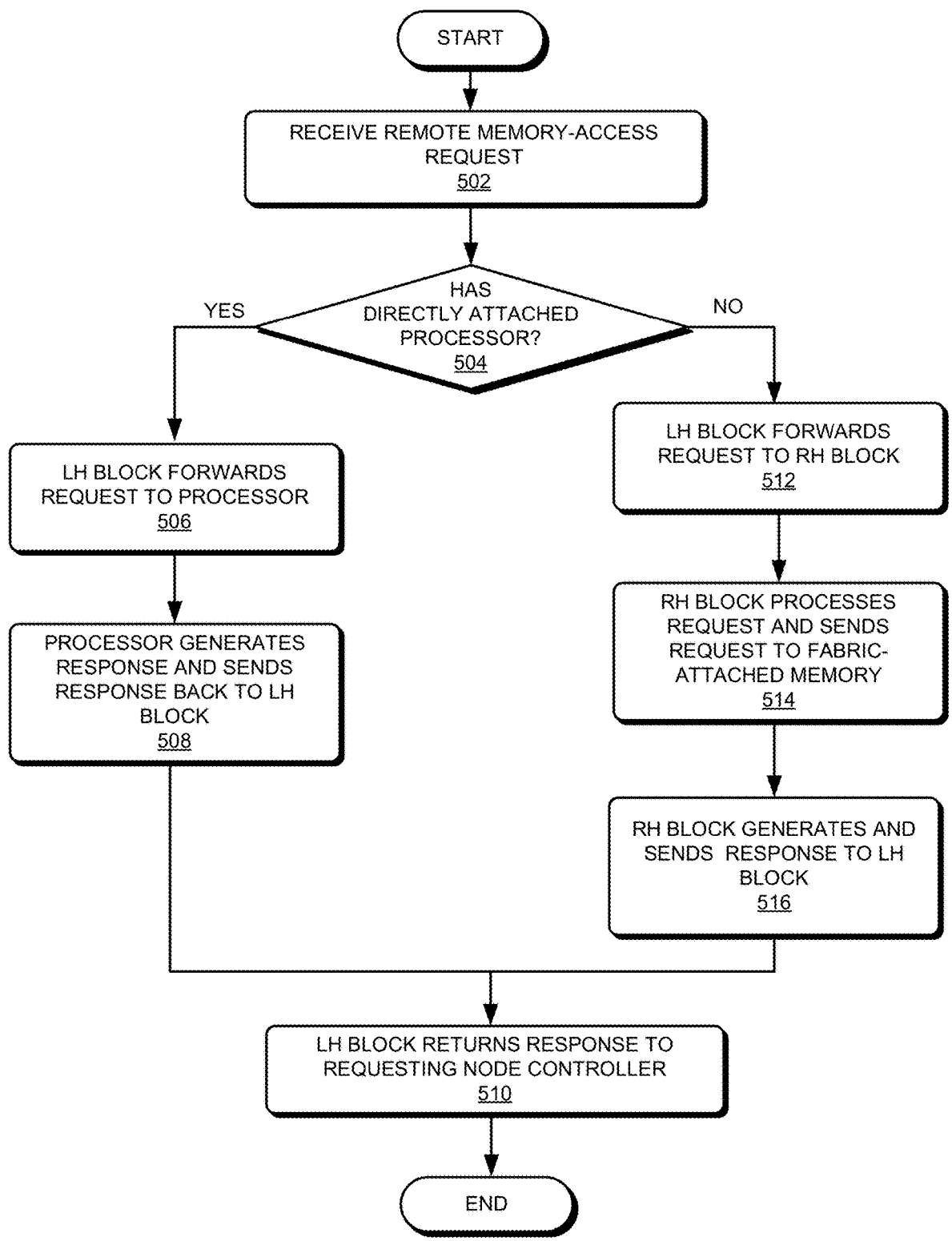
FIG. 5 presents a flowchart illustrating an exemplary process of a node controller responding to a remote memory-access, according to one embodiment.

FIG. 5 presents a flowchart illustrating an exemplary process of a node controller responding to a remote memory-access, according to one embodiment. During operation, a node controller receives a memory-access request from a remote node controller (operation 502). The memory-access request can be a read request, a write request, a read-for-ownership request, etc. The node controller can have a similar structure as the node controllers shown in FIGS. 3 and 4. As shown in FIG. 4, the LH logic block of the node controller is configured to receive, from the node-controller interface, the remote memory-access request. The LH logic block can perform various operations necessary for coherence tracking, including allocating a tracking resource and determining the ownership of the memory block associated with the request. In some embodiments, a directory-based cache-coherence protocol is used, and the LH logic block can check the directory state of the memory block associated with the request. The LH logic block can further convert the received request from the node-controller-interconnect format to the processor-interconnect format.

The node controller determines whether it has a directly attached processor (operation 504). If so, the LH logic block of the node controller forwards the memory-access request to the processor (operation 506). The processor accesses its local memory to generate a response and sends the response back to the LH logic block (operation 508). The LH logic block of the node controller can then return the response to the requesting node controller (operation 510).

On the other hand, if the node controller does not have a directly attached processor, the LH logic block of the node controller forwards the memory-access request, now in the processor-interconnect format, to the RH logic block on the same node controller via a special path (operation 512). The special path can be in the form of a direct path between the LH and RH logic blocks or a loopback path through the processor interface. Such a special path does not exist on a conventional node controller that only needs to manage cache coherency for processor-attached memories, because the LH logic and the RH logic do not need to communicate in conventional situations because they manage local and remote memory-access requests separately.

The RH block of the node controller can process the request and send the request to the fabric-attached memory via the memory interface (operation 514). Operations performed by the RH logic block can include allocating a tracking resource, decoding the addresses, and reformatting the request message. The request is now in the node-controller-interconnect format. The RH block of the node controller subsequently generates a response (e.g., read data or write confirmation) based on data returned from the fabric-attached memory and sends the response to the LH block (operation 516). The LH block returns the response to the requesting node controller (operation 510).

In general, the disclosed embodiments provide a unified node controller that facilitates hardware-managed cache coherency in a hybrid system comprising both processor-attached memories and fabric-attached memories. More specifically, the node controller can include a memory interface to communicate with fabric-attached memory modules, and hardware modules (e.g., ASICs) within the node controller can be configured to operate in two different modes, depending on whether the node controller has a directly attached processor. If a processor is attached to the node controller, the node controller manages cache coherency for memories that are local to the processor. If the network controller does not have a directly attached processor, the node controller manages cache coherency for fabric-attached memories, by treating the fabric-attached memory module as a remote memory and using its remote-memory control block (e.g., the RH logic block) to manage access. More specifically, the remote memory-access request can be passed from the local-memory control block (e.g., the LH logic block) to the remote-memory control block via a direct path or a loopback path. The remote-memory control block treats a request from the processor and a request from the local-memory control block the same way. Similarly, subsequent to obtaining a response from the fabric-attached memory, the remote-memory control block returns the response to the local-memory control block via the same special path. The local-memory control block treats a response from the processor and a response from the local-memory control block the same way. This approach allows the same cache-coherence engine to manage cache coherency for both types of memories, thus facilitating independent scaling of the processors and memories in the multiprocessor system implementing hardware-based cache coherence engines.

One embodiment can provide a node controller in a multiprocessor system. The node controller can include a processor interface to interface with a processor, a memory interface to interface with a fabric-attached memory, a node-controller interface to interface with a remote node controller, and a cache-coherence logic to operate in a first mode or a second mode. The cache-coherence logic manages cache coherence for a local memory of the processor coupled to the processor interface when operating in the first mode, and the cache-coherence logic manages cache coherence for the fabric-attached memory coupled to the memory interface when operating in the second mode.

In a variation on this embodiment, the cache-coherence logic is to operate in the first mode in response to determining that the processor is directly coupled to the node controller via the processor interface, and the cache-coherence logic is to operate in the second mode in response to determining that the node controller is not directly coupled to any processor.

In a variation on this embodiment, the cache-coherence logic can include a local-memory-control logic to manage local memory-access requests and a remote-memory-control logic to manage remote memory-access requests. When the cache-coherence logic is operating in the first mode, the local-memory-control logic is to forward a memory-access request received from a remote node controller to the processor via the processor interface to facilitate the processor in accessing its local memory. When the cache-coherence logic is operating in the second mode, the local-memory-control logic is to forward the memory-access request received from the remote node controller to the remote-memory-control logic via a special signal path between the local-memory-control logic and remote-memory-control logic.

In a further variation, the special signal path can include one of: a direct path between the local-memory-control logic and remote-memory-control logic, and a loopback path through the processor interface.

In a further variation, when the cache-coherence logic is operating in the second mode, the remote-memory-control logic is to: access the fabric-attached memory via the memory interface, generate a memory-access response, and send the memory-access response to the local-memory-control logic via the special signal path.

In a variation on this embodiment, the processor interface can include an UltraPath Interconnect (UPI), and the memory interface can include one of: a double-data rate (DDR) interface, a graphic DDR (GDDR) interface, a high bandwidth memory (HBM) interface, a Peripheral Component Interconnect Express (PCIe) interface, a compute express link (CXL) interface, a Gen-Z interface, an Infiniband interface, an Ethernet interface, and a Fibre Channel interface.

In a variation on this embodiment, the cache-coherence logic can implement a directory-based cache-coherence protocol.

In a variation on this embodiment, the cache-coherence logic can include one or more hardware modules to facilitate hardware-based coherence tracking.

One embodiment can provide a multiprocessor system. The multiprocessor system can include a first node controller that is directly coupled to a processor and a second identical node controller that is not directly coupled to any processor and is coupled to a fabric-attached memory. The first node controller is to operate in a first mode to manage cache coherence for a local memory of the processor; and the second node controller is to operate in a second mode to manage cache coherence for the fabric attached memory.

One embodiment can provide a system and method for managing cache coherence in a multiprocessor system. During operation, a node controller can receive a memory-access request from a remote node controller in the multiprocessor system. In response to determining that a processor is directly coupled to the node controller, the system can configure the node controller to operate in a first mode such that the node controller manages cache coherence for a local memory of the processor. In response to determining that the node controller is not directly coupled to any processor and is coupled to a fabric-attached memory, the system can configure the node controller to operate in a second mode such that the node controller manages cache coherence for the fabric-attached memory.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments have been presented for purposes of illustration and description only. They are not intended to be exhaustive or to limit the scope of this disclosure to the forms disclosed. Accordingly, many modifications and variations will be apparent to practitioners skilled in the art.

What is claimed is:

1. A node controller in a multiprocessor system, the node controller comprising:
   a processor interface to interface with a processor;
   a memory interface to interface with a fabric-attached memory;
   a node-controller interface to interface with a remote node controller; and
   a cache-coherence logic comprising a local-memory-control logic to manage local memory-access requests and a remote-memory-control logic to manage remote memory-access requests;
   wherein the cache-coherence logic is to maintain cache coherency for a local memory of the processor coupled to the processor interface or the fabric-attached memory coupled to the memory interface;
   wherein, when the cache-coherence logic is maintaining cache coherency for the local memory, the local-memory-control logic is to forward a memory-access request received from the remote node controller to the processor via the processor interface to facilitate the processor in accessing the local memory; and
   wherein, when the cache-coherence logic is maintaining cache coherency for the fabric-attached memory, the local-memory-control logic is to forward the memory-access request received from the remote node controller to the remote-memory-control logic via a special signal path between the local-memory-control logic and remote-memory-control logic.

2. The node controller of claim 1, wherein the cache-coherence logic is to maintain cache coherency for the local memory in response to determining that the processor is directly coupled to the node controller via the processor interface, and wherein the cache-coherence logic is to maintain cache coherency for the fabric-attached memory in response to determining that the node controller is not directly coupled to any processor.

3. The node controller of claim 2, wherein the special signal path comprises one of:
   a direct path between the local-memory-control logic and remote-memory-control logic; and
   a loopback path through the processor interface.

4. The node controller of claim 2, wherein, when the cache-coherence logic maintains cache coherency for the fabric-attached memory, the remote-memory-control logic is to:
   access the fabric-attached memory via the memory interface;
   generate a memory-access response; and
   send the memory-access response to the local-memory-control logic via the special signal path.

5. The node controller of claim 1, wherein the processor interface comprises an UltraPath Interconnect (UPI), and wherein the memory interface comprises one of: a double-data rate (DDR) interface, a graphic DDR (GDDR) interface, a high bandwidth memory (HBM) interface, a Peripheral Component Interconnect Express (PCIe) interface, a compute express link (CXL) interface, a Gen-Z interface, an Infiniband interface, an Ethernet interface, and a Fibre Channel interface.

6. The node controller of claim 1, wherein the cache-coherence logic implements a directory-based cache-coherence protocol.

7. The node controller of claim 1, wherein the cache-coherence logic comprises one or more hardware modules to facilitate hardware-based coherence tracking.

8. A multiprocessor system, comprising:
   a first node controller that is directly coupled to a processor; and
   a second identical node controller that is not directly coupled to any processor and is coupled to a fabric-attached memory;
   wherein each of the first and second node controllers comprises a cache-coherence logic comprising a local-memory-control logic to manage local memory-access requests and a remote-memory-control logic to manage remote memory-access requests;
   wherein the first node controller is to maintain cache coherency for a local memory of the processor, with the local-memory-control logic of the cache-coherence logic of the first node controller forwarding a memory-access request received from a remote node controller to the processor via the processor interface to facilitate the processor in accessing its local memory; and
   wherein the second node controller is to maintain cache coherency for the fabric-attached memory, with the local-memory-control logic of the cache-coherence logic of the second node controller forwarding the memory-access request received from the remote node controller to the remote-memory-control logic via a special signal path between the local-memory-control logic and remote-memory-control logic.

9. The multiprocessor system of claim 8, wherein each of the first and second node controllers comprises:

a processor interface to interface with a processor;
a memory interface to interface with a fabric-attached memory; and
a node-controller interface to interface with a remote node controller.

10. The multiprocessor system of claim 9, wherein the special signal path comprises one of:
a direct path between the local-memory-control logic and remote-memory-control logic; and
a loopback path through the processor interface.

11. The multiprocessor system of claim 9, wherein the remote-memory-control logic of the cache-control logic of the second node controller is to:
access the fabric-attached memory via the memory interface;
generate a memory-access response; and
send the memory-access response to the local-memory-control logic via the special signal path.

12. The multiprocessor system of claim 9, wherein the processor interface comprises an UltraPath Interconnect (UPI), and wherein the memory interface comprises one of: a double-data rate (DDR) interface, a graphic DDR (GDDR) interface, a high bandwidth memory (HBM) interface, a Peripheral Component Interconnect Express (PCIe) interface, a compute express link (CXL) interface, a Gen-Z interface, an Infiniband interface, an Ethernet interface, and a Fibre Channel interface.

13. The multiprocessor system of claim 8, wherein the first and second node controllers implement a directory-based cache-coherence protocol.

14. The multiprocessor system of claim 8, wherein each of the first and second node controllers comprises one or more hardware modules to facilitate hardware-based coherence tracking.

15. A method to maintain cache coherency in a multiprocessor system, the method comprising:
receiving, by a node controller, a memory-access request from a remote node controller in the multiprocessor system;
in response to determining, by the node controller, that a processor is directly coupled to the node controller, configuring a cache-coherence logic of the node controller to maintain cache coherency for a local memory of the processor; and
in response to determining, by the node controller, that the node controller is not directly coupled to any processor and is coupled to a fabric-attached memory, configuring the cache-coherence logic of the node controller to maintain cache coherency for the fabric-attached memory;
wherein the cache-coherence logic comprises a local-memory-control logic to manage local memory-access requests and a remote-memory-control logic to manage remote memory-access requests;
wherein, while the cache-coherence logic maintains cache coherency for the local memory, the local-memory-control logic is to forward a memory-access request received from a remote node controller to the processor via the processor interface to facilitate the processor in accessing its local memory; and
wherein, while the cache-coherence logic maintains cache coherency for the fabric-attached memory, the local-memory-control logic is to forward the memory-access request received from the remote node controller to the remote-memory-control logic via a special signal path between the local-memory-control logic and remote-memory-control logic.

16. The method of claim 15, wherein the node controller comprises:
a processor interface to interface with a processor;
a memory interface to interface with a fabric-attached memory; and
a node-controller interface to interface with a remote node controller.

17. The method of claim 16, wherein the special signal path comprises one of:
a direct path between the local-memory-control logic and remote-memory-control logic; and
a loopback path through the processor interface.

* * * * *